United States Patent [19]

Anthony

[11] Patent Number: 5,625,973
[45] Date of Patent: May 6, 1997

[54] FISHING ROD HOLDER

[75] Inventor: James T. Anthony, Noblesville, Ind.

[73] Assignee: Indiana Mills and Manufacturing, Inc., Westfield, Ind.

[21] Appl. No.: 462,950

[22] Filed: Jun. 5, 1995

[51] Int. Cl.⁶ .................................................. A01K 97/10
[52] U.S. Cl. ....................... 43/21.2; 43/26; 211/70.8; 224/922
[58] Field of Search ............... 43/21.2, 26; 211/70.8; 114/364; 224/922, 162, 568, 406; 410/100, 97; 248/332

[56] References Cited

U.S. PATENT DOCUMENTS

| | | | |
|---|---|---|---|
| 2,144,876 | 1/1939 | Garnett | 224/922 |
| 2,474,513 | 6/1949 | Behrens | 224/568 |
| 2,536,797 | 1/1951 | Cooke | 211/70.8 |
| 2,623,760 | 12/1952 | Fornelius | 410/97 |
| 2,907,506 | 10/1959 | Sammons | 224/922 |
| 3,204,362 | 9/1965 | Andrews | 43/26 |
| 3,487,947 | 1/1970 | Bogar | 211/70.8 |
| 3,841,648 | 10/1974 | Meyer . | |
| 3,994,048 | 11/1976 | Rosenthal . | |
| 4,132,381 | 1/1979 | McClellan | 211/70.8 |
| 4,170,801 | 10/1979 | Ward . | |
| 4,640,039 | 2/1987 | O'Neill . | |
| 4,897,952 | 2/1990 | Hawie | 43/21.2 |

*Primary Examiner*—Kurt Rowan
*Attorney, Agent, or Firm*—Woodard, Emhardt, Naughton Moriarty & McNett

[57] ABSTRACT

A fishing rod holder for a boat. A plurality of spring biased spools are fixedly mounted to the boat and have retractable belts which may be pulled outwardly. The distal ends of the belts have headed members which are releasably lockable into cavities provided on the boat and spaced apart from the spools. Fishing rods may be secured to the boat by extending the belts from the spools across the fishing rods to the cavities.

11 Claims, 4 Drawing Sheets

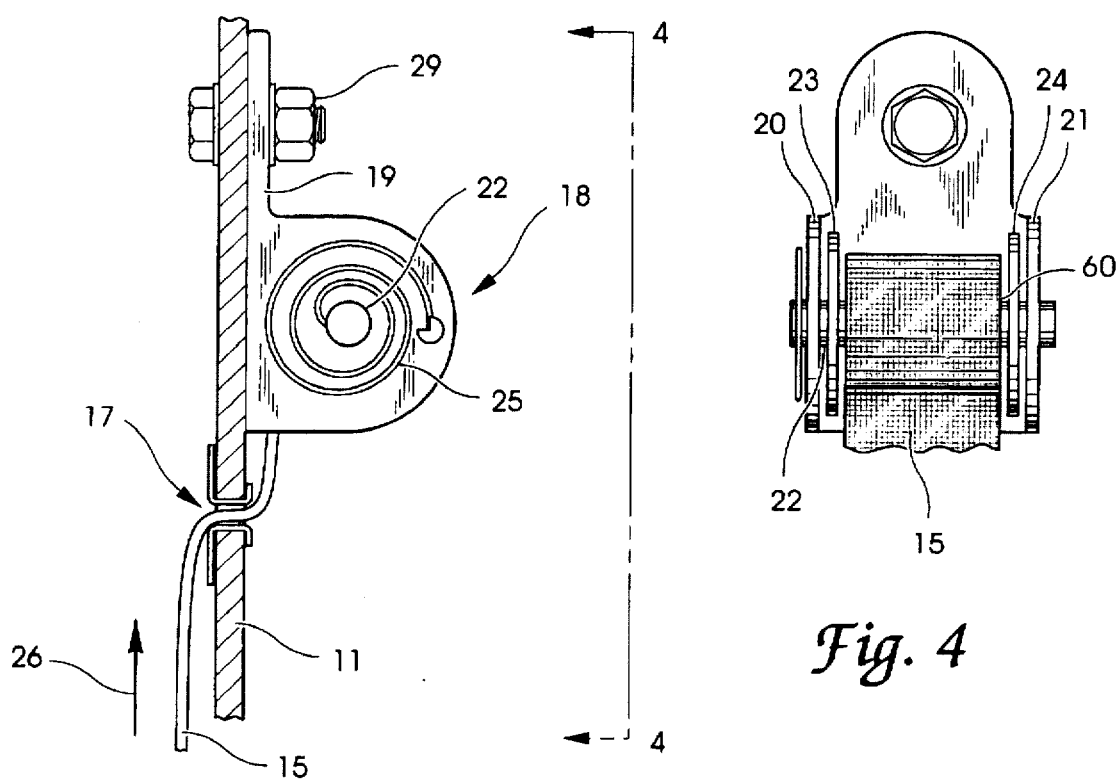
Fig. 3
Fig. 4
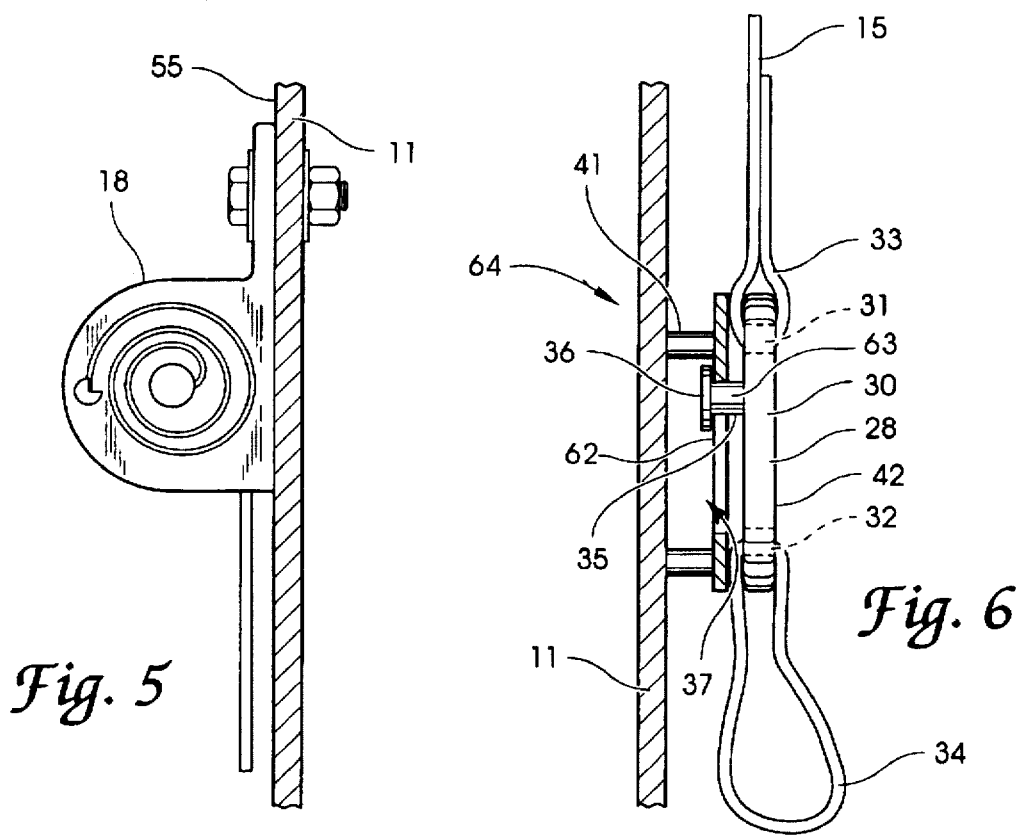
Fig. 5
Fig. 6

FISHING ROD HOLDER

BACKGROUND OF THE INVENTION

1. Field of the Invention:

This invention is in the field of holders configured as straps.

2. Background of the Invention:

Fishing rods are typically stored in a boat by placing the rods on the floor of the boat. This technique creates problems in that the occupants may either step or trip on the rods. Further, the fishing rods will project at various angles and in many cases extend upwardly from the boat floor over the boat seats thereby creating a hazard.

Various devices have been provided for storing or holding fishing rods. For example, U.S. Pat. No. 4,640,039 issued to O'Neill discloses a flexible belt attached to the boat with the opposite ends of the belt then being wrapped around the fishing rod. Conventional fastening strips are provided at the opposite ends of the belt to secure the belt ends. Similar types of devices have been provided for holding skis and ski poles such as shown in the U.S. Pat. No. 3,994,048 issued to Rosenthal and U.S. Pat. No. 3,841,648 issued to Meyer. Another technique is to provide a case or box for holding fishing rods such as shown in U.S. Pat. No. 4,170,801 issued to Ward.

The prior devices for holding fishing rods require external boat space occupied by the storage or holding device. For example, the devices employing belts or straps allow the straps to dangle downward in the boat allowing entanglements as well as weather deterioration of the fastening devices. Likewise, cases or boxes for holding fishing rods occupy a considerable amount of space and are therefore not practical. I have designed a retractable fishing rod holder which minimizes the external space occupied by the holder when not in use. Further, the holder is automatically adjustable over a wide variety of belt lengths depending upon the amount of fishing rods and material to be held by the belt.

SUMMARY OF THE INVENTION

A holder for mounting a fishing rod to a support comprising a plurality of belt spools rotatably mountable to a support, a plurality of springs connected to the spools and operable to rewind the spools but yieldable to allow the spools to unwind, and a plurality of belts having proximal ends fixedly mounted to the spools and distal ends which may be pulled outwardly as the belts are unwound on the spools. The spools are aligned along one side of a path to allow the belts to be pulled outwardly across the path against and atop a fishing rod located in the path. A plurality of first locking portions are aligned with the spools and are mounted to the support along the path. A plurality or second locking portions motto ted to the distal ends of the belts are releasably lockable with the first locking portions to hold the belts against the fishing rod and within the path.

It is an object of the present invention to provide a new and improved fishing rod holder.

A further object of the present invention is to provide a storage device within a boat for holding fishing rods.

An additional object of the present invention is to provide a boat fishing rod holder which is retracted when not in use minimizing boat storage space for the holder.

Related objects and advantages of the present invention will be apparent from the following description.

BRIEF DESCRIPTION OF THE DRAWINGS

FIG. 3 is a fragmentary enlarged cross-sectional view taken along the line 3—3 of FIG. 1 and viewed in the direction of the arrows.

FIG. 4 is a top view of the retractor of FIG. 3 looking in the direction of arrows 4—4 of FIG. 3.

FIG. 5 is the same view as FIG. 3 only showing an alternate version of the belt retractor.

FIG. 6 is a fragmentary enlarged cross-sectional view taken along the line 6—6 of FIG. 1 and viewed in the direction of the arrows.

DESCRIPTION OF THE PREFERRED EMBODIMENT

Figure 1:
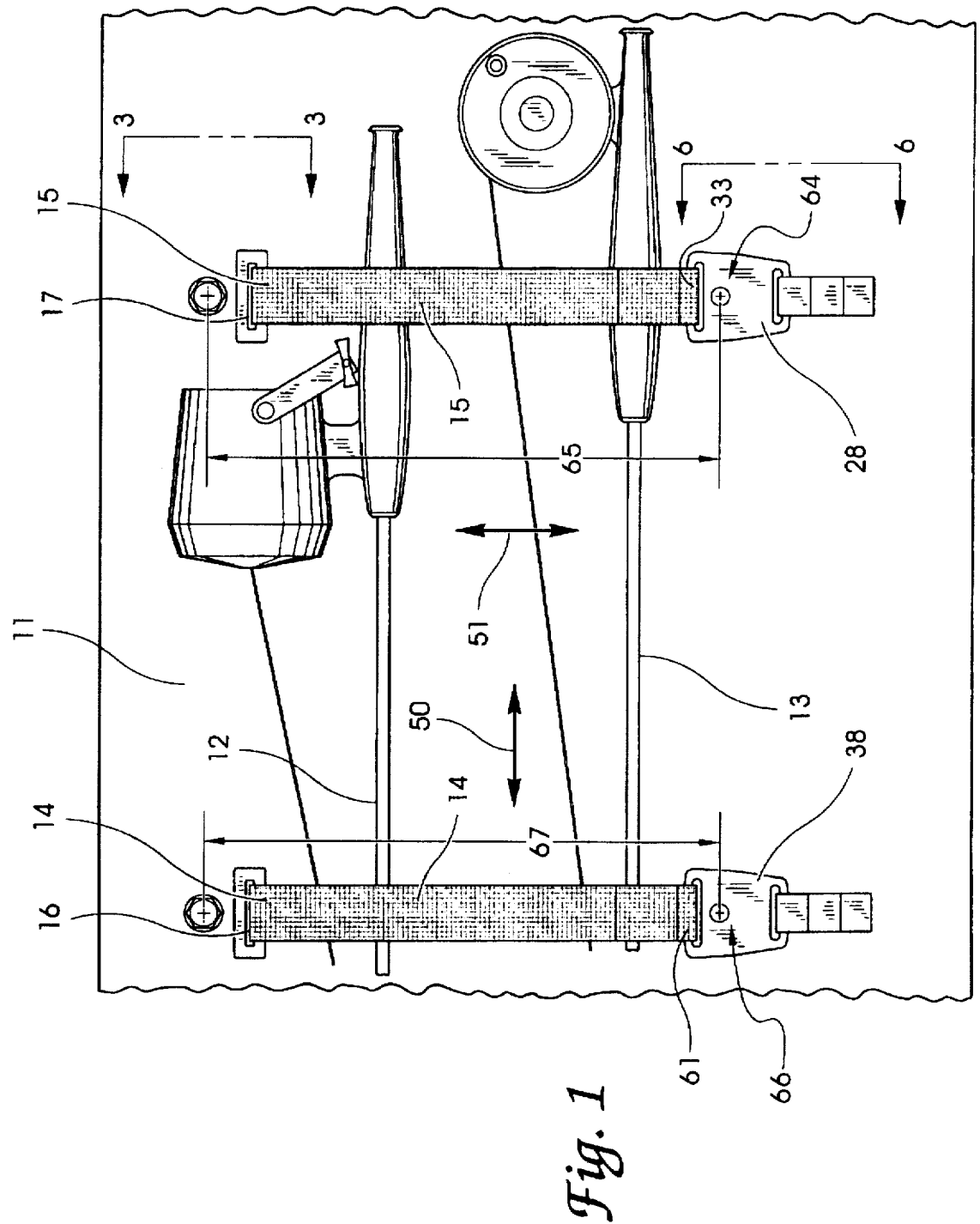
FIG. 1 is a front view of the fishing rod holder shown in the extended or holding position.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Wall 11 may either be a vertical side wall or the boat or a horizontally extending deck or floor wall. Referring now more particularly to FIG. 1, there is shown the interior surface of a boat wall 11 having secured thereto a pair of fishing rods 12 and 13. A pair of belts 14 and 15 are mounted to a pair of belt spools located on the opposite side of wall 11 with the belts being extendable outwardly through respectively slots 16 and 17.

The spool used to hold belt 15 will now be described it being understood that an identical description applies to the spool holding belt 14. Spool 18 (FIG. 3) includes a main frame 19 with a pair of outwardly extending flanges 20 and 21 upon which is mounted spool axle 22. Axle 22 extends through flanges 20 and 21 and has fixedly mounted thereon a pair of circular spool walls 23 and 24 with the proximal end 60 of belt 15 being attached to axle 22 between spool walls 23 and 24. The circumferentially extending outer edge of each wall 23 and 24 is smooth and is not provided with ratchet teeth as is the custom in a conventional belt retractor. A wire spring 25 has one end attached to an end of axle 22 with the opposite end of the spring being attached to flange 20. Spring 25 is wound so that the spool is normally urged to rotate in order to retract belt 15 in the direction of arrow 26. The spring, however, is yieldable to allow the belt to be withdrawn or extended outwardly across the fishing poles. The spool is free to rotate at all times in either rotational direction to retract belt 15 in the direction of arrow 26 or to allow the belt to be extended. Spring 25 provides a retraction force on the spool; however, the spool is never locked in place in position with the conventional pawl and ratchet combination. Frame 19 is mounted to wall 11 on the side of the wall opposite of the positioning of the fishing rods. A slot 17 is provided in wall 11 to allow belt 15 to move therethrough; however, slot 17 is sized to prevent passage of handle 28 (FIG. 1) attached to the distal end 33 of the belt.

A conventional fastener 29 (FIG. 3) is used to fixedly mount frame 19 to the interior surface of wall 11.

Figure 2:
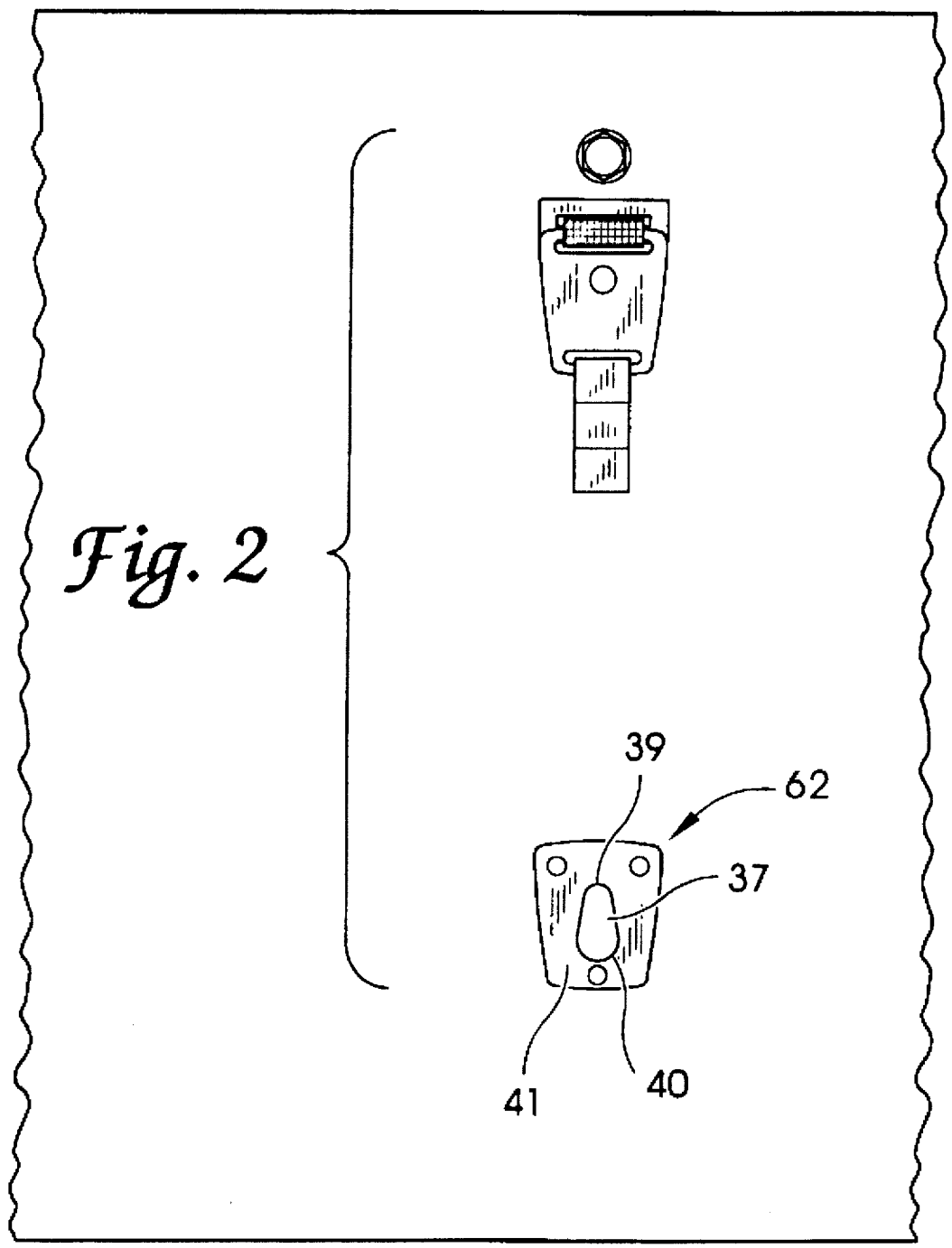
FIG. 2 is the same view as FIG. 1 only showing the right half of the holder with the holder in a retracted position.
Figure 7:
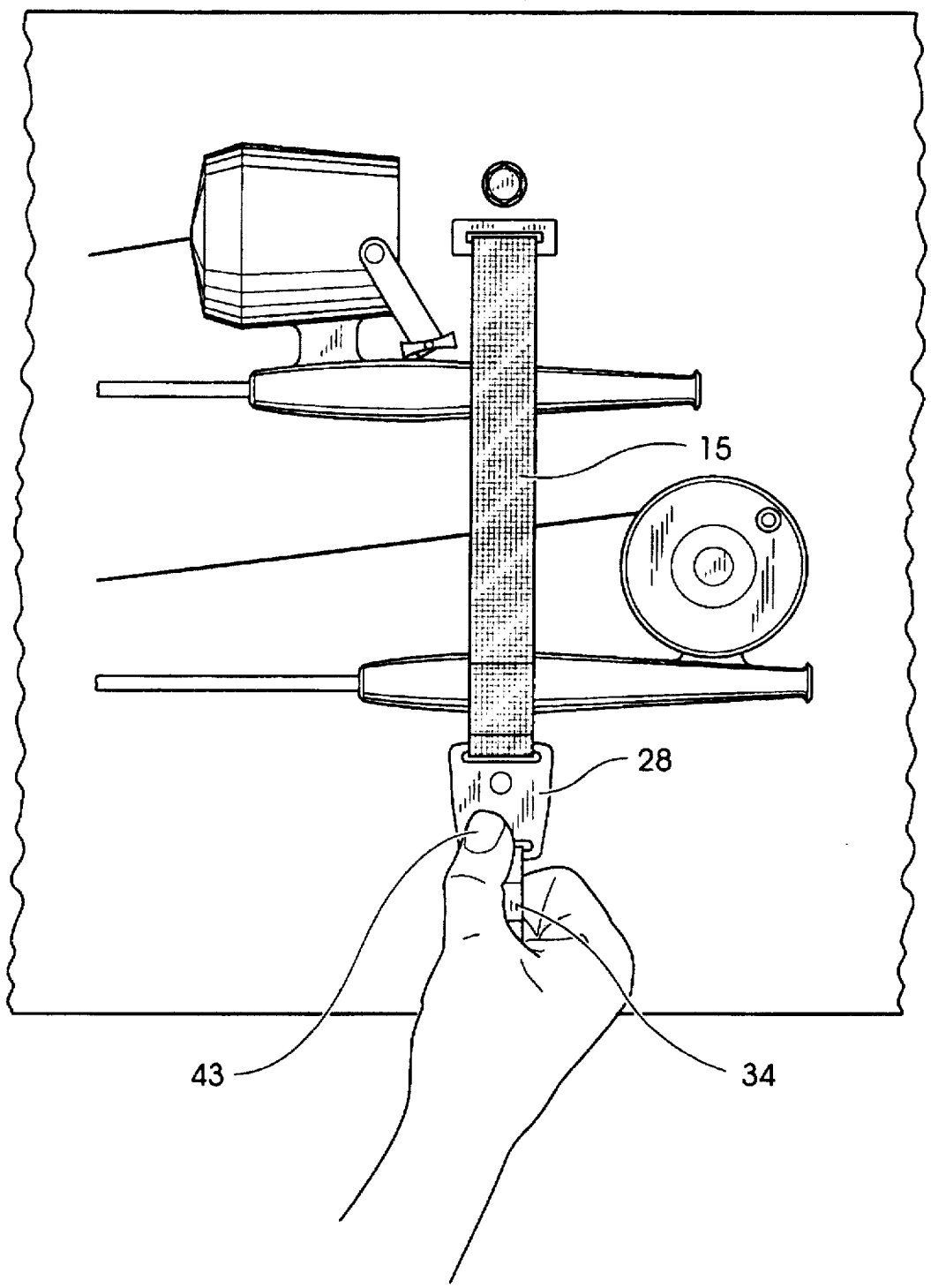
FIG. 7 is the same view as FIG. 2 only showing the belt handle being held in the extended position.

A pair of handles 28 and 38 are respectively attached to the distal ends 33 and 61 of belts 15 and 14. Handle 28 will now be described it being understood that an identical description applies to handle 38. Handle 28 includes a rigid main body 30 (FIG. 6) with a top slot 31 and a bottom slot 32 extending therethrough. The distal end 33 of belt 15 extends through slot 31 and then backwardly onto the belt being fixed thereto by stitching or other means thereby pivotally mounting rigid member 30 to the belt. Handle 28 also includes a flexible web 34 extending through slot 32 and attached to itself forming a flexible web loop. Fixed to and extending rearwardly from rigid member 30 is a headed member having a rod 35 with one end attached to rigid member 30 and the opposite end attached to an enlarged head 36 removably received within cavity 37 (FIG. 2). The cavity includes a restricted top end 39 (FIG. 2) and an enlarged bottom end 40 formed by a thin wall 41 attached to boat wall 11. The diameter of head 36 is less than the enlarged end 40 of cavity 37 but greater than the width of the restricted top end 39 of cavity 37. Thus, handle 28 may be grasped and pulled downwardly extending belt 15 atop and against fishing rods 12 and 13 with head 36 being inserted into cavity 37. Once the handle is released, the spring biased spool is operable to slightly retract the belt causing head 36 to move upwardly into cavity 37 to position head 36 between walls 41 and 11 preventing the headed member from escaping the cavity until the handle is subsequently grasped and pulled downwardly and outwardly. Slots 31 and 32 are spaced apart forming an outwardly facing thumb receiving area 42 allowing the thumb 43 (FIG. 7) to be placed thereon while looped web 34 is grasped within the palm of the hand facilitating insertion and removal of head 36 relative to cavity 37.

In order to mount fishing rods 12 and 13, the rods are extended along a path in the direction of arrows 50 between the spools and cavities 37. Handles 28 and 38 are grasped and pulled outwardly in a generally perpendicular direction 51 to path 50 so that the belts extend atop and against the fishing rods. Heads 36 of handles 28 and 38 are then inserted into their respective cavities 37.

The holder illustrated in FIG. 1 includes a pair of belt spools with accompanying springs to rewind the spools to retract belts 14 and 15. At least two such spools are required to hold the fishing rods although additional spools and belts may be mounted to the boat wall. The spools are spaced apart and are alignable along one side of the path extending in direction 50 whereas walls 41 forming cavities 37 are located on the opposite side of the path. Walls 41 forming cavities 37 provide portions 62 releasably interlockable with the headed members forming portions 63 attached to handles 28 and 38. Thus, a first locking means 64 is formed having a first portion 62, located on the wall 11 spaced apart a first space 65 from the spool 18, and a second portion 63 located on the first handle 28 which is releasably interlockable with the first portion. Similarly, a second locking means 66 is formed having a third portion, located on the wall 11 spaced apart a second space 67 from the spool associated with web 14, and a fourth portion located on the second handle 38 which is releasably interlockable with the third portion. Handles 28 and 38 are identical as are the walls 41 located beneath each handle. It is possible to reverse the position of the headed members and cavities so that the cavity is formed on the handles with the headed member projecting outwardly from the boat wall; however, the preferred design is illustrated in the drawing. Walls 41 along with the corresponding cavities 37 are aligned across the path from their respective spools.

The spools attached to belts 14 and 15 are recessed or mounted on the wall 11 opposite the side having the belts extending thereacross. Alternatively, the spools may be mounted upon the same side of wall 11 having fishing rods 12 and 13 mounted thereto. Such an arrangement is shown in FIG. 5 wherein spool 18 is mounted on surface 55 of wall 11 with the fishing rods 12 and 13 also mounted atop surface 55. The spools shown in FIGS. 3 and 5 are identical with the exception that the wire springs are mounted to the appropriate spool flange to extend spiralingly in the correct direction to urge the spools to retract the attached belt. In the case of the alternate version shown in FIG. 5, slots 16 and 17 are not provided.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A holder for mounting a fishing rod comprising:

a wall;

a first spool mounted to said wall and having a first web with a first proximal end mounted thereto and a first distal end extendable in a first direction outwardly from said first spool;

first spring means connected to said first spool operable to normally urge said first spool to rotate in one direction locating said first distal end in a retracted position but yieldable to allow said first spool to rotate in an opposite direction when said first distal end is pulled outwardly from said first spool, said first spool free to rotate at all times to move said first web in said one direction and said opposite direction;

a second spool mounted to said wall and having a second web with a second proximal end motored thereto and a second distal end extendable outwardly in a second direction from said second spool;

second spring means connected to said second spool operable to normally urge said second spool to rotate in said one direction locating said second distal end in a retracted position but yieldable to allow second spool to rotate in said opposite direction when said second distal end is pulled outwardly from said second spool, said second spool free to rotate at all times to move said second web in said one direction and said opposite direction;

a first handle mounted to said first distal end;

a second handle mounted to said second distal end;

first interlocking means having a first portion spaced apart a first space from said first spool and located on said wall and further having a second portion located on said first handle being releasably interlockable with said first portion, said first interlocking means being operable to releasably lock said first handle to said wall once said first web is pulled over a fishing rod located in said first space with said first portion locked to said second portion: and, second interlocking means having a third portion spaced apart a second space from said second spool and located on said wall and further having a fourth portion located on said second handle being releasably interlockable with said third portion, said second interlocking means being operable to releasably lock said second handle to said wall once said second web is pulled over said fishing rod located in said second space with said third portion locked to said fourth portion.

2. The holder of claim 1 wherein:

said first spool and second spool are spaced apart in a direction generally perpendicular to said first direction.

3. The holder of claim 1 wherein:

said first handle includes a first rigid member and a first flexible member with said second portion of said first interlocking means located on said first rigid member between said first web and said first flexible member allowing grasping of said first flexible member within the palm of the hand with the thumb of the hand applied against said first rigid member; and, said second handle includes a second rigid member and a second flexible member with said fourth portion of said second interlocking means located on said second rigid member between said second web and said second flexible member allowing grasping of said second flexible member within the palm of the hand with the thumb of the hand applied against said second rigid member.

4. The holder of claim 3 wherein:

said first rigid member and said second rigid member are pivotally mounted respectively to said first web and said second web.

5. The holder of claim 4 wherein:

said first spool and said second spool are recessed within said wall being hidden from view, said wall includes a pair of slots through which said first web and said second web project with said slots sized to limit passage of said first rigid member and said second rigid member therethrough.

6. The holder of claim 5 wherein:

said second portion and said fourth portion are headed elements projecting outwardly from respectively said first rigid member and second rigid member, said first portion and said third portion are thin walls on said wall with accompanying cavities to receive said headed elements within said cavities in abutting relationship to said thin walls.

7. A holder for mounting a fishing rod to a support comprising;

a plurality of belt spools rotatably mountable to a support;

a plurality of springs connected to said spools and operable to rewind said spools but yieldable to allow said spools to unwind;

a plurality of belts having proximal ends fixedly mounted to said spools and distal ends which may be pulled outwardly as said belts are unwound on said spools, said spools alignable along one side of a path to allow said belts to be pulled outwardly across said path against and atop a fishing rod located in said path;

a plurality of first locking portions alignable with said spools and mountable to said support along a side opposite of said one side of said path: and, a plurality of second locking portions mounted to said distal ends of said belts being releasably lockable with said first locking portions to hold said belts against said fishing rod and within said path and wherein:

said second locking portions, include rigid members mounted to said distal ends of said belts, said rigid members and said first locking means include combinations of mating headed fasteners and sockets with said headed fasteners extendable lockingly into said sockets to hold said belts in place across said path but removable from said sockets to allow said belts to be rewound on said spools, said second locking portions include flexible webs fastened thereto;

said rigid members include a top slot and a bottom slot with said distal ends of said belts extending through said top slots and said flexible webs extending through said bottom slots.

8. The holder of claim 7 wherein:

said fasteners are mounted to said rigid members and said sockets are formed in said support.

9. The holder of claim 8 wherein:

said top slots are spaced apart from said bottom slots forming a thumb receiving area on a side of said rigid members opposite of said headed fasteners.

10. A holder for mounting a fishing rod comprising:

a wall;

a first spool mounted to said wall and having a first web with a first proximal end mounted thereto and a first distal end extendable in a first direction outwardly from said first spool;

first spring means connected to said first spool operable to normally urge said first spool to rotate in one direction locating said first distal end in a retracted position but yieldable to allow said first spool to rotate in an opposite direction when said first distal end is pulled outwardly from said first spool, said first spool rotatable to move said first web in said one direction and said opposite direction;

a first handle mounted to said first distal end; and, first interlocking means having a first portion spaced apart a first space from said first spool and located on said wall and further having a second portion located on said first handle being releasably interlockable with said first portion, said first interlocking means being operable to releasably lock said first handle to said wall once said first web is pulled over a fishing rod located in said first space with said first portion locked to said second portion.

11. The holder of claim 10 and further comprising:

a second spool mounted to said wall and having a second web with a second proximal end mounted thereto and a second distal end extendable outwardly in a second direction from said second spool;

second spring means connected to said second spool operable to normally urge said second spool to rotate in said one direction locating said second distal end in a retracted position but yieldable to allow second spool to rotate in said opposite direction when said second distal end is pulled outwardly from said second spool, said second spool rotatable to move said second web in said one direction and said opposite direction;

a second handle mounted to said second distal end; and second interlocking means having a third portion spaced apart a second space from said second spool and located on said wall and further having a fourth portion located on said second handle being releasably interlockable with said third portion, said second interlocking means being operable to releasably lock said second handle to said wall once said second web is pulled over said fishing rod located in said second space with said third portion locked to said fourth portion.

* * * * *

UNITED STATES PATENT AND TRADEMARK OFFICE
CERTIFICATE OF CORRECTION

PATENT NO. : 5,625,973
DATED : May 6, 1997
INVENTOR(S) : James T. Anthony

It is certified that error appears in the above-indentified patent and that said Letters Patent is hereby corrected as shown below:

Column 1, line 50 delete "motto ted" and insert --mounted--.

Column 4, line 39 delete "motored" and insert --mounted--.

Signed and Sealed this

Fifth Day of August, 1997

Attest:

BRUCE LEHMAN

Attesting Officer

Commissioner of Patents and Trademarks